US008705808B2

(12) United States Patent
Determan et al.

(10) Patent No.: US 8,705,808 B2
(45) Date of Patent: Apr. 22, 2014

(54) COMBINED FACE AND IRIS RECOGNITION SYSTEM

(75) Inventors: Gary E. Determan, Plymouth, MN (US); Vincent C. Jacobson, Eden Prairie, MN (US); Jan Jelinek, Plymouth, MN (US); Thomas Phinney, Glendale, AZ (US); Rida M. Hamza, Maple Grove, MN (US); Terry Ahrens, Plymouth, MN (US); George A. Kilgore, Colorado Springs, CO (US); Rand P. Whillock, North Oaks, MN (US); Saad Bedros, West St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 1776 days.

(21) Appl. No.: 11/681,752

(22) Filed: Mar. 2, 2007

(65) Prior Publication Data
US 2008/0075334 A1 Mar. 27, 2008

Related U.S. Application Data

(63) Continuation-in-part of application No. 11/275,703, filed on Jan. 25, 2006, now Pat. No. 7,593,550, and a continuation-in-part of application No. 11/043,366, filed on Jan. 26, 2005, now Pat. No. 7,756,301, and a continuation-in-part of application No. 11/372,854, filed on Mar. 10, 2006, and a continuation-in-part of application No. 10/979,129, filed on Nov. 3, 2004, now Pat. No. 7,362,210, which is a continuation-in-part of application No. 10/655,124, filed on Sep. 5, 2003, now Pat. No. 7,183,895, application No. 11/681,752, which is a continuation-in-part of application No. 11/382,373, filed on May 9, 2006, and a continuation-in-part of application No. 11/672,108, filed on Feb. 7, 2007, and a continuation-in-part of application No. 11/675,424, filed on Feb. 15, 2007, and a continuation-in-part of application No. 11/681,614, filed on Mar. 2, 2007, and a continuation-in-part of application No. 11/681,662, filed on Mar. 2, 2007, and a continuation-in-part of application No. 11/681,470, filed on Mar. 2, 2007, and a continuation-in-part of application No. 11/681,505, filed on Mar. 2, 2007, and a continuation-in-part of application No. 11/681,251, filed on Mar. 2, 2007, and a continuation-in-part of application No. 11/681,751, filed on Mar. 2, 2007, now Pat. No. 7,761,453.

(60) Provisional application No. 60/778,770, filed on Mar. 3, 2006, provisional application No. 60/807,046, filed on Jul. 11, 2006, provisional application No. 60/647,270, filed on Jan. 26, 2005.

(51) Int. Cl.
*G06K 9/00* (2006.01)

(52) U.S. Cl.
USPC ............................ 382/117; 382/115; 382/118

(58) Field of Classification Search
USPC ............. 382/115, 117–118; 348/78; 351/209, 351/210, 211, 212; 396/18, 51, 158
See application file for complete search history.

(56) References Cited

U.S. PATENT DOCUMENTS 4,641,349 A  2/1987  Flom et al.
4,836,670 A  6/1989  Hutchinson (Continued)

FOREIGN PATENT DOCUMENTS

EP  0484076  5/1992
EP  0593386  4/1994

(Continued)

OTHER PUBLICATIONS

AOptix Technologies, "Introducing the AOptix Insight 2 Meter Iris Recognition System," 6 pages, 2010.

(Continued)

*Primary Examiner* — Brian Le
(74) *Attorney, Agent, or Firm* — Seager Tufte & Wickhem LLC.

(57) ABSTRACT

A system using face and iris image capture for recognition of people. The system may have wide field-of-view, medium field-of-view and narrow field-of-view cameras to capture images of a scene of people, faces and irises for processing and recognition. Matching of the face and iris images with images of a database may be a basis for recognition and identification of a subject person.

17 Claims, 7 Drawing Sheets

(56) References Cited

U.S. PATENT DOCUMENTS

| | | |
|---|---|---|
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsuhita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A * | 1/2000 | Hanke et al. ............... 89/41.19 |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,363 B1 | 12/2002 | Weaver et al. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 * | 3/2004 | Hanna et al. ............... 382/117 |
| 6,718,049 B2 | 4/2004 | Pavlidis et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,879 B2 | 1/2005 | Park |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,972,797 B2 | 12/2005 | Izumi |
| 6,992,562 B2 | 1/2006 | Fuks et al. |
| 7,053,948 B2 | 5/2006 | Konishi |
| 7,071,971 B2 | 7/2006 | Elberbaum |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,204,425 B2 | 4/2007 | Mosher, Jr. et al. |
| 7,277,561 B2 | 10/2007 | Shin |
| 7,277,891 B2 | 10/2007 | Howard et al. |
| 7,298,873 B2 | 11/2007 | Miller, Jr. et al. |
| 7,315,233 B2 | 1/2008 | Yuhara |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,443,441 B2 | 10/2008 | Hiraoka |

(56) References Cited

U.S. PATENT DOCUMENTS

| | | |
|---|---|---|
| 7,460,693 B2 | 12/2008 | Loy et al. |
| 7,471,451 B2 * | 12/2008 | Dent et al. .................... 359/421 |
| 7,486,806 B2 | 2/2009 | Azuma et al. |
| 7,518,651 B2 | 4/2009 | Butterworth |
| 7,537,568 B2 | 5/2009 | Moehring |
| 7,538,326 B2 | 5/2009 | Johnson et al. |
| 7,542,945 B2 | 6/2009 | Thompson et al. |
| 7,580,620 B2 | 8/2009 | Raskar et al. |
| 7,593,550 B2 | 9/2009 | Hamza |
| 7,639,846 B2 | 12/2009 | Yoda |
| 7,722,461 B2 | 5/2010 | Gatto et al. |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,762,665 B2 * | 7/2010 | Vertegaal et al. ............. 351/209 |
| 7,777,802 B2 | 8/2010 | Shinohara et al. |
| 7,804,982 B2 | 9/2010 | Howard et al. |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0130961 A1 | 9/2002 | Lee et al. |
| 2002/0131622 A1 | 9/2002 | Lee et al. |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0014372 A1 | 1/2003 | Wheeler et al. |
| 2003/0020828 A1 | 1/2003 | Ooi et al. |
| 2003/0038173 A1 | 2/2003 | Blackson et al. |
| 2003/0046228 A1 | 3/2003 | Berney |
| 2003/0053663 A1 | 3/2003 | Chen et al. |
| 2003/0055689 A1 | 3/2003 | Block et al. |
| 2003/0055787 A1 | 3/2003 | Fujii |
| 2003/0058492 A1 | 3/2003 | Wakiyama |
| 2003/0061172 A1 | 3/2003 | Robinson |
| 2003/0061233 A1 | 3/2003 | Manasse et al. |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0076161 A1 | 4/2003 | Tisse |
| 2003/0076300 A1 | 4/2003 | Lauper et al. |
| 2003/0076984 A1 | 4/2003 | Tisse et al. |
| 2003/0080194 A1 | 5/2003 | O'Hara et al. |
| 2003/0091215 A1 | 5/2003 | Lauper et al. |
| 2003/0092489 A1 | 5/2003 | Veradej |
| 2003/0095689 A1 | 5/2003 | Volkommer et al. |
| 2003/0098776 A1 | 5/2003 | Friedli |
| 2003/0099379 A1 | 5/2003 | Monk et al. |
| 2003/0099381 A1 | 5/2003 | Ohba |
| 2003/0103652 A1 | 6/2003 | Lee et al. |
| 2003/0107097 A1 | 6/2003 | McArthur et al. |
| 2003/0107645 A1 | 6/2003 | Yoon |
| 2003/0108224 A1 | 6/2003 | Ike |
| 2003/0108225 A1 | 6/2003 | Li |
| 2003/0115148 A1 | 6/2003 | Takhar |
| 2003/0115459 A1 | 6/2003 | Monk |
| 2003/0116630 A1 | 6/2003 | Carey et al. |
| 2003/0118212 A1 | 6/2003 | Min et al. |
| 2003/0118217 A1 | 6/2003 | Kondo et al. |
| 2003/0123711 A1 | 7/2003 | Kim et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0131265 A1 | 7/2003 | Bhakta |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0152252 A1 | 8/2003 | Kondo et al. |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0169901 A1 | 9/2003 | Pavlidis et al. |
| 2003/0169907 A1 | 9/2003 | Edwards et al. |
| 2003/0173408 A1 | 9/2003 | Mosher, Jr. et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0195935 A1 | 10/2003 | Leeper |
| 2003/0198368 A1 | 10/2003 | Kee |
| 2003/0200180 A1 | 10/2003 | Phelan, III et al. |
| 2003/0210139 A1 | 11/2003 | Brooks et al. |
| 2003/0210802 A1 | 11/2003 | Schuessier |
| 2003/0218719 A1 | 11/2003 | Abourizk et al. |
| 2003/0225711 A1 | 12/2003 | Paping |
| 2003/0228898 A1 | 12/2003 | Rowe |
| 2003/0233556 A1 | 12/2003 | Angelo et al. |
| 2003/0235326 A1 | 12/2003 | Morikawa et al. |
| 2003/0235411 A1 | 12/2003 | Morikawa et al. |
| 2003/0236120 A1 | 12/2003 | Reece et al. |
| 2004/0001614 A1 | 1/2004 | Russon et al. |
| 2004/0002894 A1 | 1/2004 | Kocher |
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0012760 A1 | 1/2004 | Mihashi et al. |
| 2004/0019570 A1 | 1/2004 | Bolle et al. |
| 2004/0023664 A1 | 2/2004 | Mirouze et al. |
| 2004/0023709 A1 | 2/2004 | Beaulieu et al. |
| 2004/0025030 A1 | 2/2004 | Corbett-Clark et al. |
| 2004/0025031 A1 | 2/2004 | Ooi et al. |
| 2004/0025053 A1 | 2/2004 | Hayward |
| 2004/0029564 A1 | 2/2004 | Hodge |
| 2004/0030930 A1 | 2/2004 | Nomura |
| 2004/0035123 A1 | 2/2004 | Kim et al. |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0049687 A1 | 3/2004 | Orsini et al. |
| 2004/0050924 A1 | 3/2004 | Mletzko et al. |
| 2004/0050930 A1 | 3/2004 | Rowe |
| 2004/0052405 A1 | 3/2004 | Walfridsson |

(56) References Cited

U.S. PATENT DOCUMENTS

| | | |
|---|---|---|
| 2004/0052418 A1 | 3/2004 | DeLean |
| 2004/0059590 A1 | 3/2004 | Mercredi et al. |
| 2004/0059953 A1 | 3/2004 | Purnell |
| 2004/0061787 A1* | 4/2004 | Liu et al. .................. 348/218.1 |
| 2004/0104266 A1 | 6/2004 | Bolle et al. |
| 2004/0117636 A1 | 6/2004 | Cheng |
| 2004/0133804 A1 | 7/2004 | Smith et al. |
| 2004/0146187 A1 | 7/2004 | Jeng |
| 2004/0148526 A1 | 7/2004 | Sands et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0169817 A1 | 9/2004 | Grotehusmann et al. |
| 2004/0172541 A1 | 9/2004 | Ando et al. |
| 2004/0174070 A1 | 9/2004 | Voda et al. |
| 2004/0190759 A1 | 9/2004 | Caldwell |
| 2004/0193893 A1 | 9/2004 | Braithwaite et al. |
| 2004/0219902 A1 | 11/2004 | Lee et al. |
| 2004/0233038 A1 | 11/2004 | Beenau et al. |
| 2004/0240711 A1 | 12/2004 | Hamza et al. |
| 2004/0252866 A1 | 12/2004 | Tisse et al. |
| 2004/0255168 A1 | 12/2004 | Murashita et al. |
| 2005/0007450 A1* | 1/2005 | Hill et al. .................. 348/142 |
| 2005/0008200 A1 | 1/2005 | Azuma et al. |
| 2005/0008201 A1 | 1/2005 | Lee et al. |
| 2005/0012817 A1 | 1/2005 | Hampapur et al. |
| 2005/0029353 A1 | 2/2005 | Isemura et al. |
| 2005/0052566 A1 | 3/2005 | Kato |
| 2005/0055582 A1 | 3/2005 | Bazakos et al. |
| 2005/0063567 A1 | 3/2005 | Saitoh et al. |
| 2005/0084137 A1 | 4/2005 | Kim et al. |
| 2005/0084179 A1 | 4/2005 | Hanna et al. |
| 2005/0099288 A1 | 5/2005 | Spitz et al. |
| 2005/0102502 A1 | 5/2005 | Sagen |
| 2005/0110610 A1 | 5/2005 | Bazakos et al. |
| 2005/0125258 A1 | 6/2005 | Yellin et al. |
| 2005/0127161 A1 | 6/2005 | Smith et al. |
| 2005/0129286 A1 | 6/2005 | Hekimian |
| 2005/0134796 A1 | 6/2005 | Zelvin et al. |
| 2005/0138385 A1 | 6/2005 | Friedli et al. |
| 2005/0138387 A1 | 6/2005 | Lam et al. |
| 2005/0146640 A1 | 7/2005 | Shibata |
| 2005/0151620 A1 | 7/2005 | Neumann |
| 2005/0152583 A1 | 7/2005 | Kondo et al. |
| 2005/0193212 A1 | 9/2005 | Yuhara |
| 2005/0199708 A1 | 9/2005 | Friedman |
| 2005/0206501 A1 | 9/2005 | Farhat |
| 2005/0206502 A1 | 9/2005 | Bernitz |
| 2005/0207614 A1 | 9/2005 | Schonberg et al. |
| 2005/0210267 A1 | 9/2005 | Sugano et al. |
| 2005/0210270 A1 | 9/2005 | Rohatgi et al. |
| 2005/0210271 A1 | 9/2005 | Chou et al. |
| 2005/0238214 A1 | 10/2005 | Matsuda et al. |
| 2005/0240778 A1 | 10/2005 | Saito |
| 2005/0248725 A1 | 11/2005 | Ikoma et al. |
| 2005/0249385 A1 | 11/2005 | Kondo et al. |
| 2005/0255840 A1 | 11/2005 | Markham |
| 2006/0093190 A1 | 5/2006 | Cheng et al. |
| 2006/0147094 A1 | 7/2006 | Yoo |
| 2006/0165266 A1 | 7/2006 | Hamza |
| 2006/0274919 A1 | 12/2006 | LoIacono et al. |
| 2007/0036397 A1 | 2/2007 | Hamza |
| 2007/0086087 A1* | 4/2007 | Dent et al. .................. 359/399 |
| 2007/0140531 A1 | 6/2007 | Hamza |
| 2007/0160266 A1 | 7/2007 | Jones et al. |
| 2007/0189582 A1 | 8/2007 | Hamza et al. |
| 2007/0206840 A1 | 9/2007 | Jacobson |
| 2007/0211924 A1 | 9/2007 | Hamza |
| 2007/0274570 A1 | 11/2007 | Hamza |
| 2007/0274571 A1 | 11/2007 | Hamza |
| 2007/0286590 A1 | 12/2007 | Terashima |
| 2008/0005578 A1 | 1/2008 | Shafir |
| 2008/0075441 A1 | 3/2008 | Jelinek et al. |
| 2008/0104415 A1 | 5/2008 | Palti-Wasserman et al. |
| 2008/0148030 A1 | 6/2008 | Goffin |
| 2008/0211347 A1 | 9/2008 | Wright et al. |
| 2008/0252412 A1 | 10/2008 | Larsson et al. |
| 2009/0046899 A1 | 2/2009 | Northcott et al. |
| 2009/0092283 A1 | 4/2009 | Whillock et al. |
| 2009/0316993 A1 | 12/2009 | Brasnett et al. |
| 2010/0033677 A1 | 2/2010 | Jelinek |
| 2010/0034529 A1 | 2/2010 | Jelinek |
| 2010/0142765 A1 | 6/2010 | Hamza |
| 2010/0182440 A1 | 7/2010 | McCloskey |
| 2010/0239119 A1 | 9/2010 | Bazakos et al. |

FOREIGN PATENT DOCUMENTS

| | | |
|---|---|---|
| EP | 0878780 | 11/1998 |
| EP | 0899680 | 3/1999 |
| EP | 0910986 | 4/1999 |
| EP | 0962894 | 12/1999 |
| EP | 1018297 | 7/2000 |
| EP | 1024463 | 8/2000 |
| EP | 1028398 | 8/2000 |
| EP | 1041506 | 10/2000 |
| EP | 1041523 | 10/2000 |
| EP | 1126403 | 8/2001 |
| EP | 1139270 | 10/2001 |
| EP | 1237117 | 9/2002 |
| EP | 1477925 | 11/2004 |
| EP | 1635307 | 3/2006 |
| GB | 2369205 | 5/2002 |
| GB | 2371396 | 7/2002 |
| GB | 2375913 | 11/2002 |
| GB | 2402840 | 12/2004 |
| GB | 2411980 | 9/2005 |
| JP | 9161135 | 6/1997 |
| JP | 9198545 | 7/1997 |
| JP | 9201348 | 8/1997 |
| JP | 9147233 | 9/1997 |
| JP | 9234264 | 9/1997 |
| JP | 9305765 | 11/1997 |
| JP | 9319927 | 12/1997 |
| JP | 10021392 | 1/1998 |
| JP | 10040386 | 2/1998 |
| JP | 10049728 | 2/1998 |
| JP | 10137219 | 5/1998 |
| JP | 10137221 | 5/1998 |
| JP | 10137222 | 5/1998 |
| JP | 10137223 | 5/1998 |
| JP | 10248827 | 9/1998 |
| JP | 10269183 | 10/1998 |
| JP | 11047117 | 2/1999 |
| JP | 11089820 | 4/1999 |
| JP | 11200684 | 7/1999 |
| JP | 11203478 | 7/1999 |
| JP | 11213047 | 8/1999 |
| JP | 11339037 | 12/1999 |
| JP | 2000005149 | 1/2000 |
| JP | 2000005150 | 1/2000 |
| JP | 2000011163 | 1/2000 |
| JP | 2000023946 | 1/2000 |
| JP | 2000083930 | 3/2000 |
| JP | 2000102510 | 4/2000 |
| JP | 2000102524 | 4/2000 |
| JP | 2000105830 | 4/2000 |
| JP | 2000107156 | 4/2000 |
| JP | 2000139878 | 5/2000 |
| JP | 2000155863 | 6/2000 |
| JP | 2000182050 | 6/2000 |
| JP | 2000185031 | 7/2000 |
| JP | 2000194972 | 7/2000 |
| JP | 2000237167 | 9/2000 |
| JP | 2000242788 | 9/2000 |
| JP | 2000259817 | 9/2000 |
| JP | 2000356059 | 12/2000 |
| JP | 2000357232 | 12/2000 |
| JP | 2001005948 | 1/2001 |
| JP | 2001067399 | 3/2001 |
| JP | 2001101429 | 4/2001 |
| JP | 2001167275 | 6/2001 |
| JP | 2001222661 | 8/2001 |
| JP | 2001292981 | 10/2001 |

(56) References Cited

FOREIGN PATENT DOCUMENTS

| | | |
|---|---|---|
| JP | 2001297177 | 10/2001 |
| JP | 2001358987 | 12/2001 |
| JP | 2002119477 | 4/2002 |
| JP | 2002133415 | 5/2002 |
| JP | 2002153444 | 5/2002 |
| JP | 2002153445 | 5/2002 |
| JP | 2002260071 | 9/2002 |
| JP | 2002271689 | 9/2002 |
| JP | 2002286650 | 10/2002 |
| JP | 2002312772 | 10/2002 |
| JP | 2002329204 | 11/2002 |
| JP | 2003006628 | 1/2003 |
| JP | 2003036434 | 2/2003 |
| JP | 2003108720 | 4/2003 |
| JP | 2003108983 | 4/2003 |
| JP | 2003132355 | 5/2003 |
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | 2005008567 | 1/2005 |
| WO | WO 2005/013181 | 2/2005 |
| WO | 2005024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Bonney et al., "Iris Pattern Extraction Using Bit Planes and Standard Deviations," IEEE, pp. 582-586, 2004.

Camus et al., "Reliable and Fast Eye Finding in Close-up Images," IEEE, pp. 389-394, 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Du et al., "A One-Dimensional Approach for Iris Identification," 11 pages, prior to Jan. 25, 2006.

http://www.newscientisttech.com/article/dn11110-invention-covert-iris-sc, "Invention: Covert Iris Scanner," 3 pages, printed Feb. 8, 2007.

Huang et al., "Iris Model Based on Local Orientation Description," 5 pages, prior to Jan. 25, 2006.

(56) References Cited

OTHER PUBLICATIONS

Huang et al., "An Efficient Iris Recognition System," IEEE Proceedings of the First International Conference on Machine Learning and Cybernetics, Beijing, pp. 450-454, Nov. 4-5, 2002.
Ma et al., "Personal Identification Based on Iris Texture Analysis," IEEE Transactions on Pattern Analysis and Machine Intelligence, vol. 25, No. 12, pp. 1519-1533, Dec. 2003.
Masek, "Recognition of Human Iris Patterns for Biometric Identification," 61 pages, 2003.
Sun et al., "Robust Encoding of Local Ordinal Measures: A General Framework of Iris Recognition," 13 pages, prior to Jan. 25, 2006.
Avcibas et al., "Steganalysis Using Image Quality Metrics," IEEE Transactions on Image Processing, vol. 12, No. 2, pp. 221-229, Feb. 2003.
Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.
Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Daugman, "How Iris Recognition Works," IEEE 2002 International Conference on Image Processing, vol. I of III, 6 pages, Sep. 22-25, 2002.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
Jalaja et al., "Texture Element Feature Characterizations for CBIR," IEEE, pp. 733-736, 2005.
Kalka et al., "Image Quality Assessment for Iris Biometric," Proc. Of SPIE vol. 6202 62020D, 11 pages, 2006.
Ko et al., "Monitoring and Reporting of Fingerprint Image Quality and Match Accuracy for a Large User Application," IEEE Computer Society, Proceedings of the $33^{rd}$ Applied Imagery Pattern Recognition Workshop, 6 pages, 2004.
Lau et al., "Finding a Small Number of Regions in an Image Using Low-Level Features," Pattern Recognition 35, pp. 2323-2339, 2002.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ30N (NTSC)," 6 pages, Aug. 2002.
Wang et al, "Image Quality Assessment: From Error Visibility to Structural Similarity," IEEE Transactions on Image Processing, vol. 13, No. 4, pp. 600-612, Apr. 2004.
Wang et al., "A Universal Image Quality Index," IEEE Signal Processing Letters, vol. 9, No. 3, pp. 81-84, Mar. 2002.
Wang et al., "Local Phase Coherence and the Perception of Blur," Advances in Nueral Information Processing Systems 16, pp. 1435-1442, 2004.
Belhumeur et al., "Eigenfaces Vs. Fisherfaces: Recognition Using Class Specific Linear Projection," 14 pages, prior to Jun. 11, 2010.
Bentley et al., "Multidimensional Binary Search Trees Used for Associative Searching," Communications of the ACM, vol. 18, No. 9, pp. 509-517, Sep. 1975.
Blackman et al., "Chapter 9, Multiple Sensor Tracking: Issues and Methods," Design and Analysis of Modern Tracking Systems, Artech House, pp. 595-659, 1999.
Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.
Chen et al., "Localized Iris Image Quality Using 2-D Wavelets," LNCS vol. 3832, pp. 373-381, 2005.
Chow et al., "Towards a System for Automatic Facial Feature Detection," Pattern Recognition vol. 26, No. 12, pp. 1739-1755, 1993.
U.S. Appl. No. 12/792,498, filed Jun. 2, 2010.
U.S. Appl. No. 12/814,232, filed Jun. 11, 2010.
U.S. Appl. No. 12/814,272, filed Jun. 11, 2010.
Cula et al., "Bidirectional Imaging and Modeling of Skin Texture," Proceedings of Texture 2003, 6 pages, Oct. 17, 2003.
Cula et al., "Bidirectional Imaging and Modeling of Skin Texture," IEEE Transactions on Biomedical Engineering, vol. 51, No. 12, pp. 2148-2159, 2004.
Cula et al., "Compact Representation of Bidirectional Texture Functions," Proceedings of IEEE Computer Society Conference on Computer Vision and Pattern Recognition 2001, 8 pages, 2001.
Cula et al., "Skin Texture Modeling," International Journal of Computer Vision 2004, 34 pages, 2004.
Dabov et al., "Image Denoising by Sparse 3-D Transform-Domain Collaborative Filtering," IEEE Transactions on Image Processing, vol. 16, No. 8, pp. 2080-2095, Aug. 2007.
Dabov et al., "Image Restoration by Spars 3D Transform Collaborative Filtering," SPIE vol. 6812 681207-1, 12 pages, 2008.
Daugman, "High Confidence Visual Recognition of Persons by a Test of Statistical Independence," IEEE Transactions on Pattern Analysis and Machine Intelligence, vol. 15, No. 11, pp. 1148-1161, 1993.
Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.
Fooprateepsiri et al., "A Highly Robust Method for Face Authentication," IEEE 2009 First Asian Conference on Intelligent Information and Database Systems, pp. 380-385, 2009.
Fooprateepsiri et al., "Face Verification Base-On Hausdorff-Shape Context," IEEE 2009 Asia Conference on Informatics in Control, Automation and Robotics, pp. 240-244, 2009.
Forstner et al., "A Metric for Covariance Matrices," 16 pages, prior to Jun. 11, 2010.
Gan et al., "Applications of Wavelet Packets Decomposition in Iris Recognition," LNCS vol. 3832, pp. 443-449, 2005.
Hampapur et al., "Smart Surveillance: Applications, Technologies and Implications," IEEE, 6 pages, Dec. 15-18, 2003.
Hamza et al., "Standoff Iris Recognition Usin Non-Iterative Polar Based Segmentation," Proceedings of SPIE vol. 6944, 8 pages, 2008.
Hanna et al., "A System for Non-Intrusive Human Iris Acquisition and Identification," IAPR Workshop on Machine Vision Applications, pp. 200-203, Nov. 12-14, 1996.
http://en.wikipedia.org/wiki/Radon_transform, "Radon Transform," 5 pages, printed May 14, 2010.
Ivins et al., "A Deformable Model of the Human Iris for Measuring Small Three-Dimensional Eye Movements," Machine Vision and Applications, vol. 11, pp. 42-51, 1998.
Kadyrov et al., "The Trace Transform and Its Applications," IEEE Transactions on Pattern Analysis and Machine Intelligence, vol. 23, No. 8, pp. 811-828, Aug. 2001.
Kadyrov et al., "The Trace Transform as a Tool to Invariant Feature Construction," 3 pages, prior to Jun. 11, 2010.
Kang et al., "Improved Dual Action Contour for Iris Recognition," 10 pages, prior to Jun. 11, 2010.
Kawaguchi et al., "Detection of Eyes from Human Faces by Hough Transform and Separability Filter," IEEE, 4 pages, 2000.
Kong et al., "Detecting Eyelash and Reflection for Accurate Iris Segmentation," International Journal of Pattern Recognition and Artificial Intelligence, vol. 17, No. 6, pp. 1025-1034, 2003.
Li et al., "Appearance Modeling Using a Geometric Transform," IEEE Transactions on Image Processing, 17 pages, 2008.
Li et al., "Appearance Modeling Using a Geometric Transform," Journal Preparation for IEEE Transactions on Image Processing, 30 pages, Nov. 5, 2006.
Ma et al., "Local Intensity Variation Analysis for Iris Recognition," Pattern Recognition, vol. 37, pp. 1287-1298, 2004.

(56) References Cited

OTHER PUBLICATIONS

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication $5^{th}$ International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Larte-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., pp. 556-559 in Book Entitled "Computer Vision," Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821, filed Mar. 30, 2011.

Freeboy, "Adaptive Optics Speeds Up Airport Immigration," Optics. org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

\* cited by examiner

COMBINED FACE AND IRIS RECOGNITION SYSTEM

This application claims the benefit of U.S. Provisional Application No. 60/778,770, filed Mar. 3, 2006.

This application claims the benefit of U.S. Provisional Application No. 60/807,046, filed Jul. 11, 2006.

This application is a continuation-in-part of U.S. patent application Ser. No. 11/275,703, filed Jan. 25, 2006, which claims the benefit of U.S. Provisional Application No. 60/647,270, filed Jan. 26, 2005.

This application is a continuation-in-part of U.S. patent application Ser. No. 11/043,366, filed Jan. 26, 2005.

This application is a continuation-in-part of U.S. patent application Ser. No. 11/372,854, filed Mar. 10, 2006.

This application is a continuation-in-part of U.S. patent application Ser. No. 10/979,129, filed Nov. 3, 2004, which is a continuation-in-part of U.S. patent application Ser. No. 10/655,124, filed Sep. 5, 2003.

This application is a continuation-in-part of U.S. patent application Ser. No. 11/382,373, filed May 9, 2006.

This application is a continuation-in-part of U.S. patent application Ser. No. 11/672,108, filed Feb. 7, 2007.

This application is a continuation-in-part of U.S. patent application Ser. No. 11/675,424, filed Feb. 15, 2007.

This application is a continuation-in-part of U.S. patent application Ser. No. 11/681,614, filed Mar. 2, 2007.

This application is a continuation-in-part of U.S. patent application Ser. No. 11/681,662, filed Mar. 2, 2007.

This application is a continuation-in-part of U.S. patent application Ser. No. 11/681,751, filed Mar. 2, 2007.

This application is a continuation-in-part of U.S. patent application Ser. No. 11/681,470, filed Mar. 2, 2007.

This application is a continuation-in-part of U.S. patent application Ser. No. 11/681,505, filed Mar. 2, 2007.

This application is a continuation-in-part of U.S. patent application Ser. No. 11/681,251, filed Mar. 2, 2007, which claims the benefit of U.S. Provisional Application 60/807,046, filed Jul. 11, 2006.

The government may have rights in the present invention.

BACKGROUND

The present invention pertains to recognition systems and particularly to biometric recognition systems. More particularly, the invention pertains to combination face and iris recognition systems.

U.S. Provisional Application No. 60/778,770, filed Mar. 3, 2006, is hereby incorporated by reference.

U.S. Provisional Application No. 60/807,046, filed Jul. 11, 2006, is hereby incorporated by reference.

U.S. patent application Ser. No. 11/275,703, filed Jan. 25, 2006, is hereby incorporated by reference.

U.S. Provisional Application No. 60/647,270, filed Jan. 26, 2005, is hereby incorporated by reference.

U.S. patent application Ser. No. 10/979,129, filed Nov. 3, 2004, is hereby incorporated by reference.

U.S. patent application Ser. No. 10/655,124, filed Sep. 5, 2003, is hereby incorporated by reference.

U.S. patent application Ser. No. 11/382,373, filed May 9, 2006, is hereby incorporated by reference.

U.S. patent application Ser. No. 11/043,366, filed Jan. 26, 2005, is hereby incorporated by reference.

U.S. patent application Ser. No. 11/372,854, filed Mar. 10, 2006, is hereby incorporated by reference.

U.S. patent application Ser. No. 11/672,108, filed Feb. 7, 2007, is hereby incorporated by reference.

U.S. patent application Ser. No. 11/675,424, filed Feb. 15, 2007, is hereby incorporated by reference.

U.S. patent application Ser. No. 11/681,614, filed Mar. 2, 2007, is hereby incorporated by reference.

U.S. patent application Ser. No. 11/681,662, filed Mar. 2, 2007, is hereby incorporated by reference.

U.S. patent application Ser. No. 11/681,751, filed Mar. 2, 2007, is hereby incorporated by reference.

U.S. patent application Ser. No. 11/681,470, filed Mar. 3, 2007, is hereby incorporated by reference.

U.S. patent application Ser. No. 11/681,505, filed Mar. 3, 2007, is hereby incorporated by reference.

U.S. patent application Ser. No. 11/681,251, filed Mar. 3, 2007, is hereby incorporated by reference.

SUMMARY

The present invention is a combined face and iris recognition system.

DESCRIPTION

Figure 1:
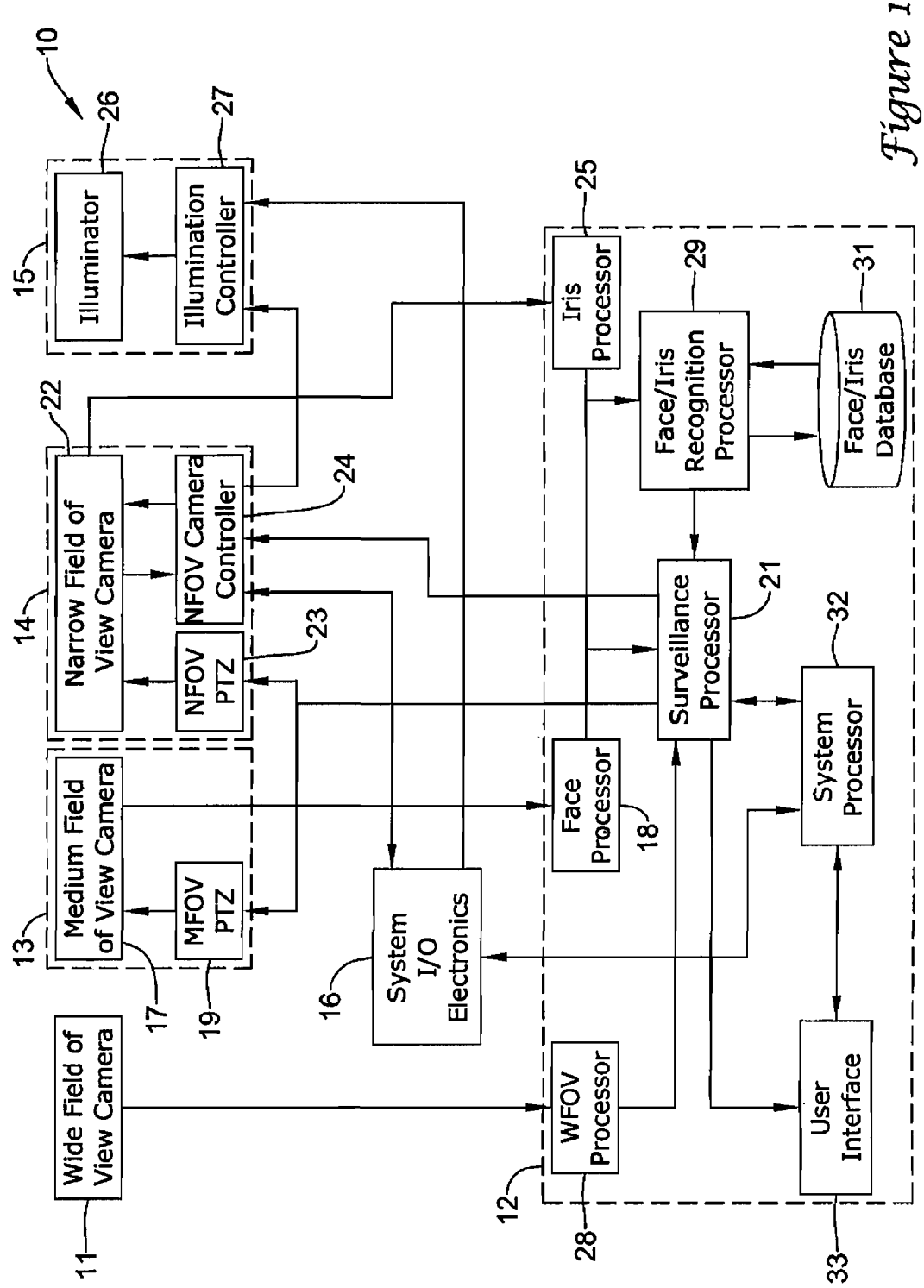
FIG. 1 is a diagram of a combined face and iris recognition system.

The present system may relate to biometrics, face and iris recognition systems, image metrics, authentication, access control, monitoring, identification, and security and surveillance systems.

Some potential applications for the present system may include airport access control to secure areas, airport trusted traveler systems, border control—watch list surveillance, industrial access control, outdoor facility access control, military checkpoint surveillance, critical infrastructure . . . .

Due to world wide increased security concerns there is a need to have the ability to accurately identify individuals at a distance. In some applications, it is essential to collect multimodal biometrics of multiple subjects standing or walking in an area. Among the various biometrics available nowadays for recognizing people, iris-based biometrics is the most accurate method for identifying people. There may be a present multimodal biometrics system relying on face and iris for guarantying high recognition rate in most challenging cases. The use of face and iris may improve the overall accuracy of the system. The human iris may provide a robust biometrics signature; however, collecting iris information from a distance appears challenging for several reasons. People may be in arbitrary places in the environment; people might not be looking straight into the device; people's head poses might be arbitrary; people's eyelids might occlude part of the iris signature and therefore provide a partial biometrics; and finally, people might be freely moving in the environment monitored by the present apparatus. Stand-off iris acquisition may also address challenging problems related to imaging the irises with sufficient resolution required for inferring a robust signature. Furthermore, a robust iris signature may be present at just a near infrared wavelength, requiring the use of a sensor capable of measuring such wavelengths, and the use of a near infrared illuminator to guarantee good imaging conditions.

Iris recognition may have high accuracy in identifying humans. Iris recognition systems may also have suitability, as an exceptionally accurate biometric can be derived from its extremely data-rich physical structure, stability over time, and non-contact acquisition. Related art iris recognition systems may require users to be within a few inches of the sensor and look directly into the sensor, or towards a specific area. The present system does not necessarily have such a requirement.

The present invention and system may use commercial off the shelf (COTS) face recognition technology combined with custom iris processing algorithms to accurately recognize subjects based on the face and iris at distances significantly greater than a few inches. The present combined face and iris recognition system (CFAIRS) may perform automatic illumination, detection, acquisition and recognition of faces and irises at ranges out to five meters (over 16 feet). The system may also automatically recognize multiple subjects standing in a scene, and optionally enroll any subjects not previously seen in a database.

Relative to the operation of the system, there may be a stationary wide field of view COTS stereo camera 11 for initial subject detection (FIG. 1). It may then use a pan-tilt-zoom (PTZ) COTS medium field of view camera 17 to zoom in and acquire the face of each subject within the field of view of camera 11. The acquired faces may be sent to a COTS face processing software package for recognition, such as with processors 18 and 29. In parallel, a modified PTZ COTS narrow field of view camera 22 may acquire images of the irises for each of the subjects. The system may use modified COTS flash flood illuminators 26 with a controller 27 to control the amount of illumination on a subject.

The acquired iris images may be processed for inferring a signature allowing recognition of a person. Various processing might be required for inferring such signature from an image such as pupil detection, iris segmentation, feature extraction and signature matching software. These processing steps might be optimized for irises acquired at a distance where off-axis gaze and eyelid occlusions are common. The iris processing software may be specifically designed to deal with untrained or unaware users, dealing with issues such as off-axis gaze and partial occlusions of the iris due to half-way closed eyes.

FIG. 1 is a diagram of the present combined face and iris recognition system 10. The system may have a wide field of view (WFOV) camera 11 for surveillance of a scene having one or more subjects of interest, such as people. Camera 11 might be a wide angle stereo camera for providing distance to the targets or subjects of interest. Camera 11 may be connected to an overall system processing unit 12. A camera module 13 may be connected to unit 12. It may be used for obtaining images of faces of people. A high resolution narrow field of view camera module 14 may be connected to unit 12. Module 14 may be used for obtaining images of a feature of a face such as an iris. An illumination module 15 may be connected to module 14. Module 15 may be used for illuminating items for use with the high resolution module 14 to obtain good images of both irises. Module 15 may be able to illuminate with infrared light. A system input/output interface electronics (I/O electronics) module 16 may be connected to unit 12, module 14 and module 15.

Module 13 may have a medium field-of-view (MFOV) camera (e.g., security camera) 17 that is connected to a face "process" 18 in unit 12. The term "processor" may be used in lieu of "process" in that a process would include processing. Such processes or processors may be a part of a larger processor, such as a system processor. A pan-tilt-zoom (PTZ) control unit 19 may be connected to the MFOV camera 17. The PTZ unit 19 may be connected to a surveillance process or processor 21 in the overall system processing unit 12. Module 14 may have a high resolution narrow field-of-view (NFOV) camera 22, and a pan-tilt and zoom (PTZ) control unit 23 connected to camera 22 and the surveillance processor 21. A NFOV camera controller 24 may be connected to the high resolution camera 22, the system I/O electronics module 16 and the surveillance processor 21. The camera might be connected to the WFOV stereo camera 11. The camera 22 may also be connected to an iris process or processor 25.

Module 15 may have an illuminator module consisting of a number of near infrared illuminators 26 and an illumination controller 27 connected to the illuminators 26. Controller 27 may also be connected to I/O electronics module 16 and the NFOV camera controller 24.

The WFOV camera 11 may be connected to a WFOV process or processor 28 of unit 12. WFOV processor 28 may be connected to surveillance processor 21. The face processor 18 may be connected to the surveillance processor 21 and to a face/iris recognition processor 29. Iris processor 25 may be connected to a surveillance processor 21 and the face/iris recognition processor 29. The face/iris recognition processor 29 may be connected to the surveillance processor 21. The face/iris recognition processor 29 may be connected to a face/iris database 31.

The system I/O electronics module 16 may be connected to a system processor 32. The surveillance processor 21 may be connected to the system processor 32. A user interface 33 may be connected to the surveillance processor 21 and the system processor 32.

Figure 2:
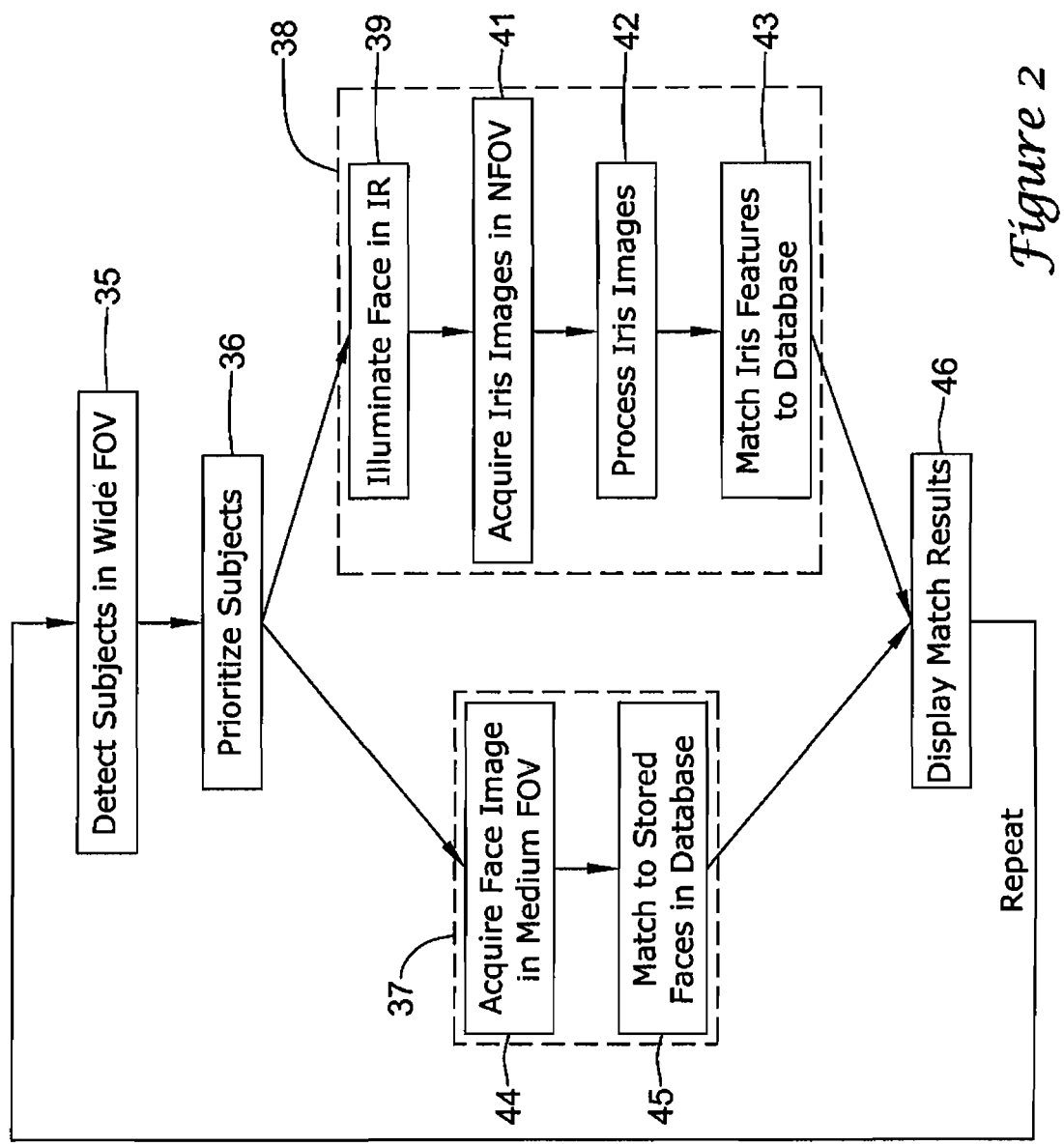
FIG. 2 is a diagram of an approach for the face and iris recognition system.

FIG. 2 shows a processing flow in the present system 10 (FIG. 1). In a first step 35, subjects may be detected in the wide field of view image. This step 35 may use an open source or other suitable algorithms for face detection. A wide FOV stereo camera 11 may also compute the range to each of the subjects in a scene. A next step 36 may include prioritization of the subjects in the scene monitored by the present system. Detected subjects might be prioritized for iris and face acquisition. The prioritization scheme might use quality of the imaged biometrics (i.e., face and iris) or the motion of people in the scene. Quality of the imaged biometrics might be measured by the quantity or quality of the face and iris images captured, or confidence measures obtained after matching the subject with the database. After prioritization, the face processing (branch 37) and iris processing (branch 38) may occur in parallel.

The face processing branch 37 may use the subject location and range information detected and computed by the wide FOV stereo camera 11 to point the medium field of view camera 17 at a subject. A face image may be acquired at step 44 and then sent to the COTS face recognition software or processor 18. The face recognition software or processor 18 may compute features on the face image and compare them against features in a stored database 31, at step 45, with a recognition processor 29 for identification of the subject. If the face or features do not appear in the database, then they may be enrolled in the database.

The iris branch 38 may use the subject location and range information detected and computed by the wide FOV stereo camera 11 to point the modified near infrared (NIR) illuminators 26 to illuminate the face at step 39. The system 10 may do the iris image acquisition in near IR to highlight lower contrast iris features. A next step 41 uses the subject location and range information detected and computed by the wide FOV stereo camera 11 to point the NFOV high resolution camera 22 at the subject, and zoom at the right scale, which may then acquire the iris image. The high resolution camera 22 may be modified to remove an IR blocking filter, or camera 22 may use a NIR sensor. The system may control the focus and zoom of camera 22, using the camera controller 24. As an example, a two part algorithm may be used to focus the iris camera 22 on the subject's iris. This algorithm may first use the subject range to compute the right zoom factor required for imaging irises with sufficient resolution, auto-focus the camera 22 using visible light, and then it may use the subject range to compute a focus offset to get the image in focus in the NIR wavelength. Other kinds of suitable algorithms may be used.

After iris acquisition, the iris images may be processed with custom iris processing algorithms to extract unique features, at step 42, with an iris processor 25. The extracted features may be matched to features stored in a database 31, at step 43, with the recognition processor 29, to identify the subject. If the extracted features are not matched to features stored in the database, the subject may be enrolled in the system by adding the features and subject information to the database.

Another step 46 in the system 10 process may be a display of the matched results for both the face and iris. Matched results may be a corroboration of the identity of the subject. For specific applications, these results may be passed to a security system (e.g., access control). The entire process may then be repeated with a return to step 35 for other subjects. A custom architecture may maintain the inter-component communications and control for the system.

Figure 3:
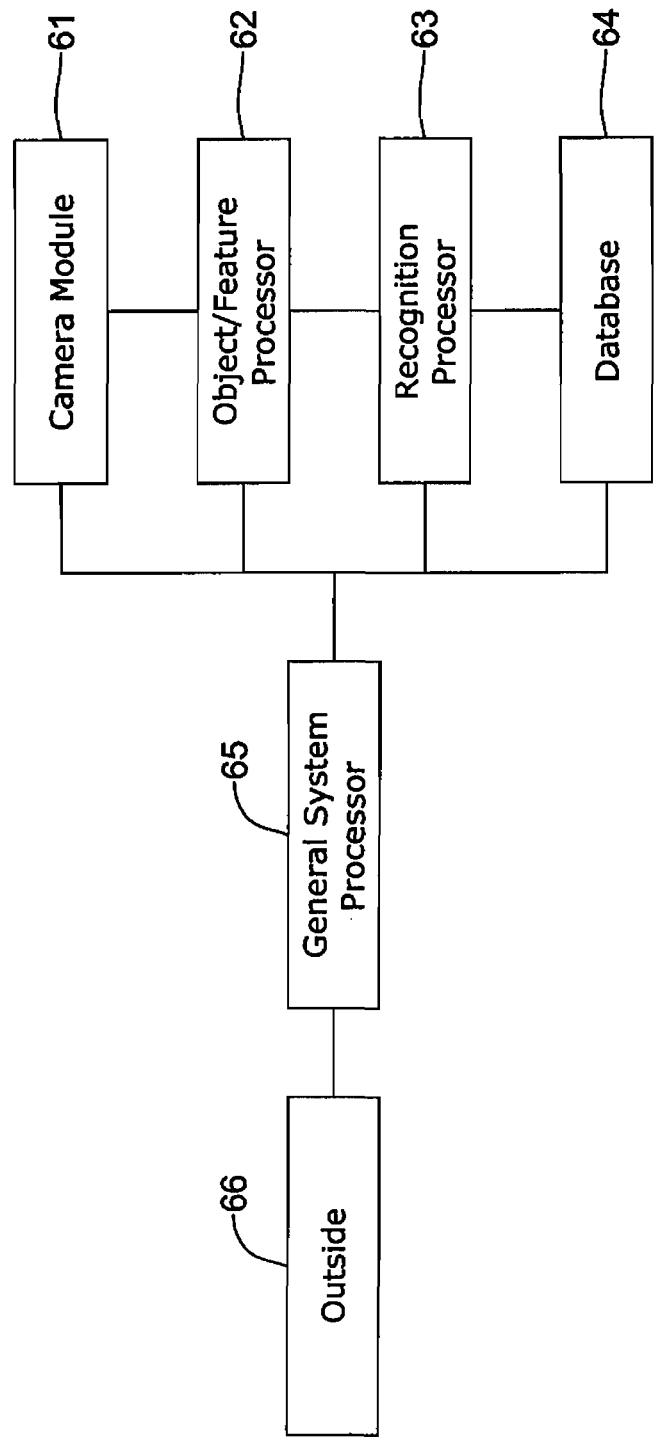
FIG. 3 is a block diagram of the recognition system.

FIG. 3 shows a general layout of the present system. There may be camera or sensor module 61 for obtaining images of one or more subjects in a scene. Images of objects and features of each subject may be obtained by the camera module. These images may be processed by an object/feature processor 62. The processed images may go to a recognition processor 63 which may interact with an object/feature database 64, to perform matching object images and feature images with like images in the database 64 purposes of seeking recognition and identity of the subject. For an example, a subject may be a person, an object may be a face and a feature may be an iris. The subject, object and feature could represent other entities.

The camera module 61 may take WFOV images of a scene with one or more subjects. The module 61 may take MFOV images of an object of the one or more subjects. Also, module 61 may take NFOV images of a feature of the object. The module 61 may take pictures of the various fields-of-view with just one adjustable camera with adjustable resolution, or with more than one camera. A general processor 65 may coordinate various operations of the module 61 and processors 62 and 63. The processor 65 may provide user interfacing and also a connection with the world outside of the present system. It may even provide the recognition processor 63 with an external database located at the outside 66 via internet cable, wireless and other media.

The present recognition system 10 may have an enclosure including the following items. The items may include a commercial off the shelf (COTS) wide field of view (WFOV) stereo camera 11, a COTS medium field of view pan-tilt-zoom (PTZ) security or other kind of camera system 13 and a narrow field of view, such as a high resolution, iris camera system 14. The narrow field of view camera system 14 may include a modified COTS high resolution camera 22, motorized COTS zoom lens, a narrow field of view iris camera controller 24, and a customized pan tilt zoom PTZ controller unit 23. One of the cameras 17 and/or 22 may be a standard PTZ camera. The present recognition system may also include an illumination system 15, system I/O electronics 16 and a processing system 12. The illumination system 15 may include a number of modified flash illuminators 26 and an illuminator controller 27. The processing system 12 may include several computers, a system processor, a digital signal processor or a customized processing board. The system may provide a user interface 33 having a monitor, a keyboard with a build-in mouse, and a keyboard, video, and mouse (KVM) switch.

It may be noted that the COTS WFOV stereo camera 11 may be used for locating the position of people in the scene. The COTS medium field of view PTZ security camera 17 may be used to capture images of the people's faces. The high resolution iris camera system 14 may be used to capture near infrared iris images of the people in the scene. The iris camera 22 may be connected to the customized PTZ controller unit 23 and can allow the camera 22 to be pointed to people in the scene. The iris camera controller 24 may control a motorized COTS zoom lens which allows the system to zoom in on the irises in the scene. It may also be connected to a modified lens extension along with the extension lens communication hardware that enables the system to override the auto-focus control.

The illumination system 15 may have a number of modified flash illuminators 26 and associated illuminator electronics. The illuminator electronics 27 may allow the system to selectively select the flash units used for each picture taken. The system I/O electronics 16 may be used for initializing components by switching on/off power to the devices. It may also be used to monitor the camera to detect when the auto-focus is ready and it may also be used to select illuminators before they are fired.

The processing system 12 which includes computers may be used for the processing and storage of the images as well as for the user interface 33. There also may be a monitor and a keyboard with a build-in mouse which is used for the user interface. The KVM switch may be used to switch between computers for debugging purposes.

Some of these components may be modified. The COTS high resolution camera 22 may have a blocking infrared mechanism. A PTZ unit may be customized to fit the camera 22 with mechanical stops installed to limit the travel.

The COTS zoom lens may be engineered with gears and a motor to allow electronic control over the zoom and focus settings. The lens extension may be disassembled and the electronics be modified. The flash illuminators 26 may be modified so that they can be remotely triggered and have the "on" time of the flash reduced. A visible light filter may be added to allow the illumination to be limited to mostly infra-red.

Some of the operation of the present recognition system 10 may be noted. As a person enters a scene, a WFOV camera 11 may detect and send images to a WFOV processor 12. The WFOV processor may locate the person's head position and range and send coordinates of the head to a surveillance processor. The surveillance processor 21 may prioritize which person in the scene needs to be captured with either the MFOV camera 17 or the iris camera 22. Camera 17 may be a security camera. The surveillance processor may send PTZ coordinates to the camera PTZ 19. The camera PTZ 19 may move to a correct location and send a command to the camera 17, which may then take a picture of the person and send the image to the face/iris recognition processor 29. The face/iris recognition processor may check the database 31 for a face match and may enroll the face if it does not have a match.

The surveillance processor 21 may send the PTZ coordinates to the corresponding PTZ 23 of the narrow field of view (NFOV) camera 22. The PZT 23 may move the camera to the position and zoom coordinates and then send a command to the NFOV or iris camera 22. The iris camera 22 may use its built-in auto focus electronics to focus the image in the visible wavelength. The system may wait for the auto-focus to complete, and then apply a focusing offset, based on the range of the subject, to get the image in focus in the near infrared wavelength. The infrared illuminators may then fire and the iris camera 22 may then take a picture of the person and send the image to the face/iris recognition processor 29 via processor 25. The face/iris recognition processor 29 may check a database 31 for a match of the irises and may enroll the irises if there is no match. The face/iris recognition processor 29 may also keep track of pairing face and irises from the same subject.

A feature of the present recognition system 10 is that it may use either face, iris or both a face and iris in the recognition process. The system may work at large distances (≥5 m., 16+ ft.). Also, the system may handle a large number of subjects.

Figure 4:
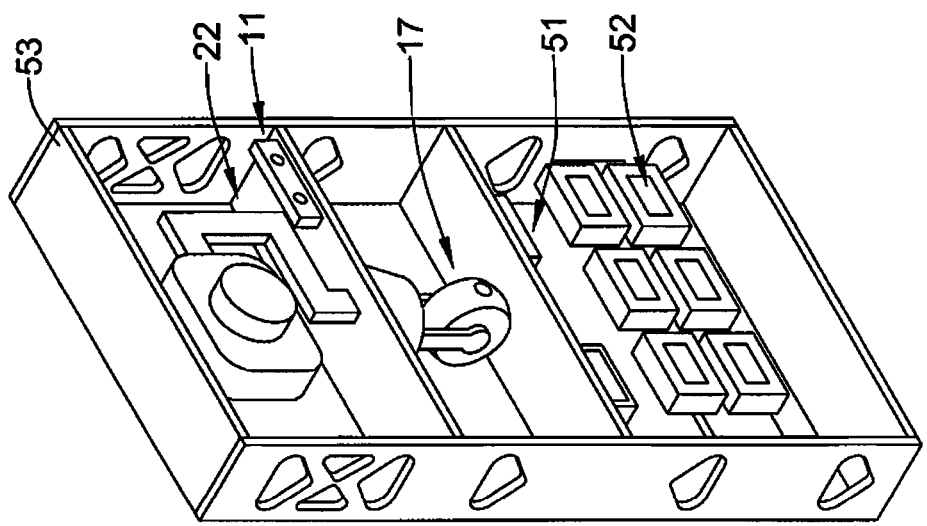
FIG. 4 is an illustration of some of the hardware that might be used for the recognition system.

FIG. 4 shows an example structure 53 containing system 10. A high resolution camera 22, a range estimation camera 11 and a face capture camera 17 are shown. Custom electronics 51 may encompass items of unit 12 and other items of a control and electronic nature. Also shown are flashes 52 which may be a part of illuminator 26.

Figure 5A:
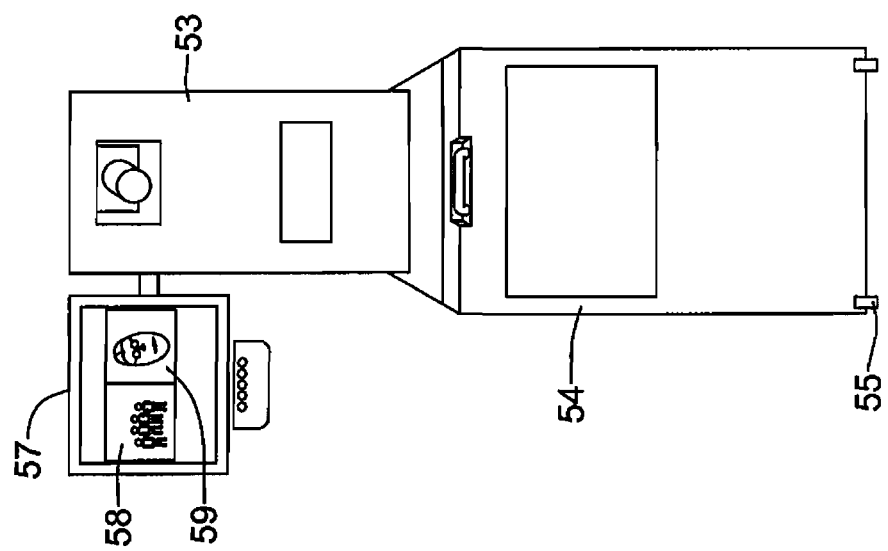
FIGS. 5a, 5b and 5c illustrate the enclosure and display for the recognition system.
Figure 5B:
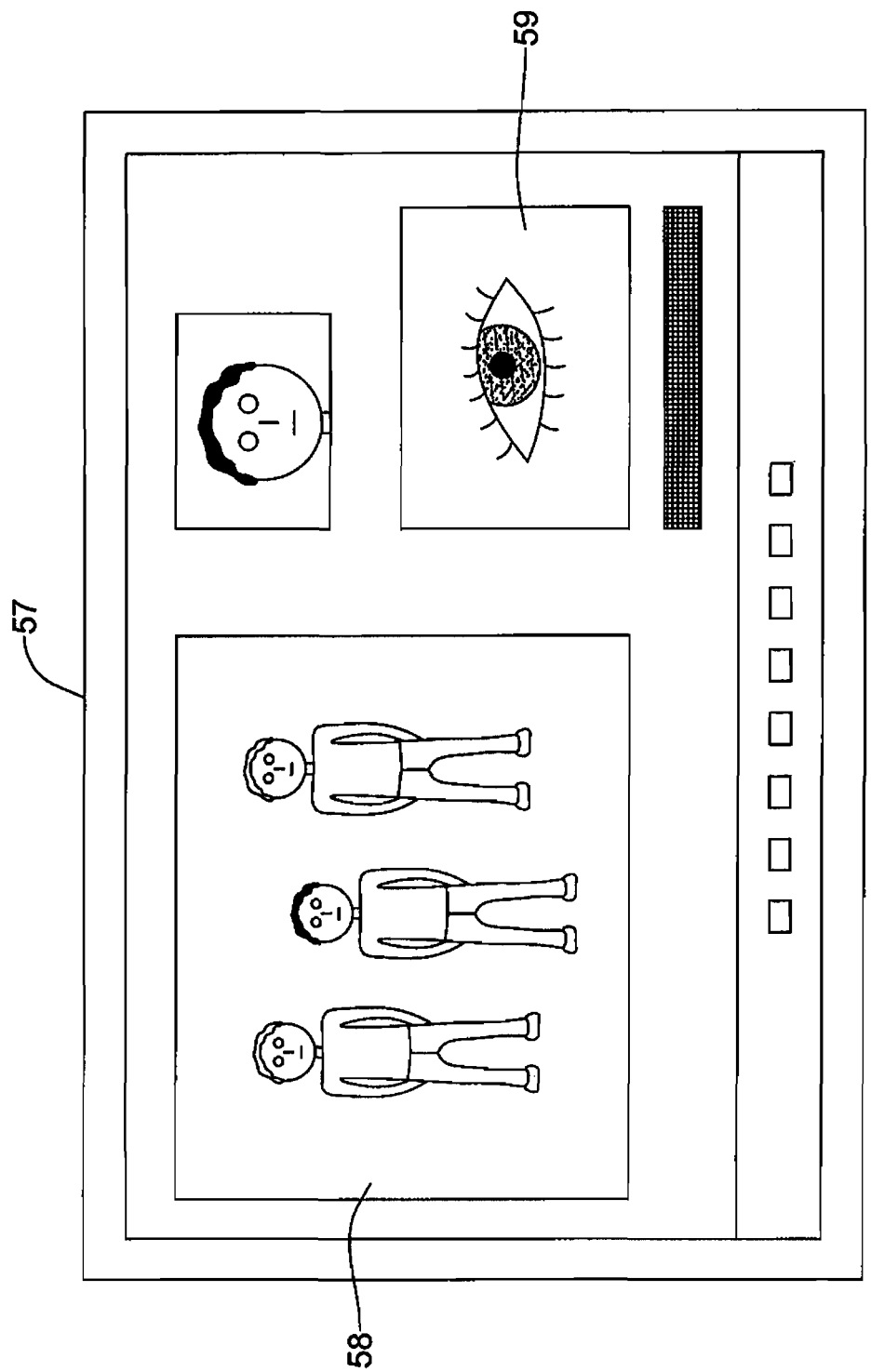
Figure 5C:
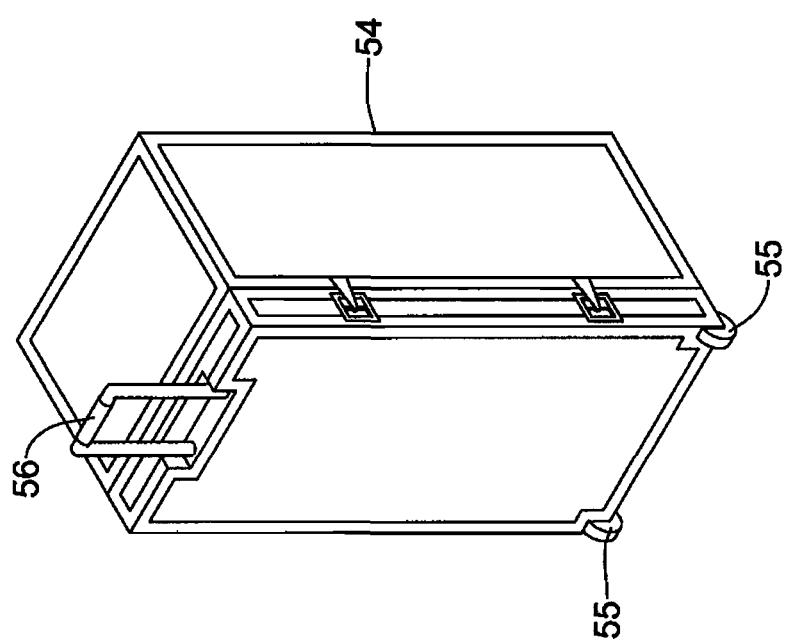

FIGS. 5a and 5c show cabinetry for encasing and/or enclosing the system 10. Structure 53 of FIG. 4 may be situated on top of cabinet 54 when open for use as shown in FIG. 5a. FIG. 5c shows the cabinet 54 closed up with structure 53 inside. The cabinet 54 may be rolled on wheels 55 and pulled by a handle 56. Associated with structure 53 may be a display/interface 57. It may show a scene 58 of several subjects one or more of which have a face image captured by a camera. An inset 59 may alternatively display a face, or a close-up of an eye or iris of the subject being imaged. Items 57, 58 and 59 are shown in FIG. 5b.

An alternative instantiation of this invention may combine the face and iris acquisition functions into a single camera. This may combine the narrow field of view camera and the medium field of view camera with a single camera that could image the full face and the irises at a high resolution.

An alternative instantiation of this invention may simplify the WFOV camera by discarding the stereo sensor and use anthropometric information computed from the wide field of view imagery of the WFOV camera to provide an estimate of the range of the subject in the scene.

Another instantiation of this invention may have the narrow field of view PTZ camera performing the functions of the wide field of view camera, the medium field of view camera, and the narrow field of view camera into a single camera. This camera may use a longer zoom setting to do the wide field of view subject detection, a medium field of view zoom setting to do the face acquisition and a narrow field of view zoom setting to do the iris acquisition.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A subject recognition system comprising:
    a wide field-of-view camera configured to locate positions and ranges of people in an area;
    a medium field of view camera configured to capture images of faces of the people;
    a narrow field of view camera configured to capture images of irises of the people; and
    a processing system configured to receive image information from the wide field-of-view, medium field of view, and narrow field of view cameras, the processing system being configured to perform biometric identity recognition processing on image information from the wide field-of-view, medium field of view, and narrow field of view cameras,
    wherein the processing system is configured to identify the individual identity of persons based upon the images of faces captured by the medium field of view camera; and
    wherein the processing system is configured to identify the individual identity of persons based upon the images of irises captured by the narrow field of view camera.

2. The system of claim 1, further comprising a controller for driving a zoom of the narrow field of view camera.

3. A biometric human recognition system comprising:
    a wide field of view camera configured for initial subject detection;
    a medium field of view camera configured for acquiring images of faces of subjects;
    a narrow field of view camera configured for acquiring images of irises of subjects; and
    a processing system configured to receive image information from the wide field of view, medium field of view, and narrow field of view cameras, the processing system being configured to perform facial identity recognition processing on image information from the medium field of view camera and iris identity recognition processing on image information from the narrow field of view camera;
    wherein the processing system is configured to corroborate matched results of both the face and iris of one of the subjects.

4. The system of claim 3, further comprising a user interface configured to display a scene of one or more subjects, a face of one of the one or more subjects, and an iris of the one of the one or more subjects.

5. The system of claim 3, further comprising a user interface, and wherein the processing system may display matched results for both a face and an iris of one of the subjects.

6. The system of claim 1, wherein the wide field of view camera is for estimating a distance between the cameras and the subjects.

7. The system of claim 1, wherein the distance to the subject may be inferred by stereo or from a calibrated camera and anthropometric knowledge.

8. The system of claim 1, wherein a correct zoom factor of the narrow field of view is estimated for capturing iris images.

9. The system of claim 1, wherein the processing system comprises a mechanism for storage and retrieval of images.

10. The system of claim 9 further comprising:
    a mechanism for face and iris matching and/or enrolling connected to the processing system; and
    an interface module connected to the mechanism for face and iris matching and/or enrolling and to the wide field of view camera, the medium field of view camera and the narrow field of view camera.

11. The system of claim 10, wherein the interface module comprises an iris processor connected to the narrow field of view camera and to the mechanism for face and iris matching and/or enrolling.

12. The system of claim 10, further comprising an illumination system connected to the interface module.

13. The system of claim 12, wherein the illuminator is an infrared iris illuminator.

14. The system of claim 3, wherein the system is capable of performing detection, acquisition and recognition of faces and irises at ranges out to at least five meters.

15. The system of claim 1, wherein the processing system may keep track of pairing face and irises belonging to a same subject of the subjects.

16. The system of claim 1, further comprising a user interface, and wherein the processing system may display matched results for both a face and an iris of a subject of the subjects.

17. The system of claim 1, wherein the system is capable of performing detection, acquisition and recognition of faces and irises at ranges out to at least five meters.

* * * * *